United States Patent Office 3,284,278
Patented Nov. 8, 1966

3,284,278
PROCESS FOR THE ADHESIVE BODYING OF OLEFIN COPOLYMERS TO SYNTHETIC AND NATURAL FIBERS AND SHAPED ARTICLES OBTAINED THEREFROM
Luigi Falcone, Como, and Giuseppe Strano and Mario Milano, Ferrara, Italy, assignors to Montecatini Società Generale per l'Industria Mineraria e Chimica, Milan, Italy
No Drawing. Filed Sept. 15, 1965, Ser. No. 487,609
Claims priority, application Italy, Oct. 6, 1961, 18,051/61, Patent 660,426
23 Claims. (Cl. 117—76)

The present invention relates to a process for the adhesive bodying of saturated amorphous copolymers, more particularly copolymers of ethylene with an alpha-olefin, to natural and synthetic fibers, and to the shaped articles obtained from this process, and is a continuation-in-part of our application Serial Number 228,201, filed on October 3, 1962.

The bodying of textile fibers to natural and synthetic rubbers is of great commercial interest and makes possible the production of numerous articles such as a rubber-coated fabrics for tires, conveyor belts, V-belts, and rubber-coated fabrics suitable for numerous other applications.

The bodying of natural rubber and elastomers of the dienic type to cotton fibers does not present any particular difficulties, however, with other synthetic fibers, which are generally obtained by extrusion and therefore have a smooth surface, various difficulties arise.

In general, substances which may be used to aid in these bodying operations consist of products possessing ambivalent chemical functions, i.e., products capable of reacting with the synthetic fiber and also with the rubber material. More particularly, in the case of the bodying natural rubber to rayon, a resorcinol-formaldehyde resin, obtained from suitable ratios of resorcinol and formaldehyde and which is aged for a given time, is used as the ambivalent chemical substance.

These resorcinol-formaldehyde resins contain free hydroxyls of a phenolic nature, which are capable of reacting with the cellulose hydroxyls of rayon, and also contain functional groups possessing one phenolic hydroxyl and one methylenic hydroxyl in an ortho position, which may, by addition of the double bond of natural rubber, form 6-member rings.

In case of polyamide fibers (i.e., nylon), the bodying operation is carried out, in general, by using polyisocyanates which react both with nylon and with the alpha-methylenic hydrogen of natural rubber.

With saturated amorphous copolymers of ethylene with propylene or butene and, with alpha-olefin copolymers, in general, these methods cannot be successful used due to the essentially paraffinic nature of the copolymer products.

The lack of adhesion of these copolymers to synthetic and natural fibers heretofore did not allow for the production of articles reinforced with these fibers, e.g., tire carcasses, and thus represented a significant limitation on the full commercial use of these ethylene copolymers.

It is an object of the present invention to provide a process which makes possible the bodying of these copolymers to natural or synthetic fibers and the production of a wide range of shaped articles essentially consisting of these fibers and olefin copolymers.

Another object of the present invention is to provide a method for bodying olefin copolymers to natural or synthetic fibers by interposing a layer containing the copolymer, reinforcing fillers, maleic acid and organic polyisocyanates in such amounts that there is an excess of isocyanic with respect of carboxylic.

Further objects and the advantages of the invention will become hereinafter apparent.

According to the present invention, there is applied onto the fiber or onto the article obtained from the fibers, a first layer which contains an adhesive of the type conventionally used in the bodying of fibers to dienic rubbers and either a chemically modified copolymer and/or an unmodified copolymer, in admixture with a chemical agent capable of modifying said copolymer in situ. If desired, reinforcing fillers and the vulcanization agents may be present in this first layer.

Onto this layer a further layer is applied which contains the unmodified copolymer, reinforcing fillers and vulcanization agents.

The whole mass may then be vulcanized by heating to a temperature between 110° and 220° C., preferably between 140° and 180° C.

The copolymers used in the process according to the present invention are copolymers of ethylene with a higher alpha-olefin having the formula $CH_2=CH-CH_2R$, in which R is a hydrogen atom or a methyl group, having a molecular weight between 60,000 and 800,000, preferably between 80,000 and 500,000 and an ethylene molar content of between 10 and 80%.

According to a preferred feature of the present invention, the adhesive is a water-soluble condensation product of a phenol with formaldehyde, preferably such as the resorcinol-formaldehyde resins used on rayon fibers.

According to another feature of the invention, the adhesive may be a polyisocyanate such as used with polyamides (nylon).

The copolymer used according to the present invention in the first layer can be a previously chemically modified copolymer or a copolymer as is (unmodified) in admixture with the modifying agent; the copolymer therefore being modified in situ.

The previously modified copolymers are obtained by treating the unmodified copolymer with a sulfochlorinating agent or with a particular agent capable of causing a partial cross-linking. The sulfochlorinated copolymer contains from 0.05 to 5% of sulfur and from 1 to 40% of chlorine, while the partially cross-linked copolymer is obtained by the treatment at between 150° and 200° C. of a mix containing 0.05 to 10 parts of a compound containing a double bond conjugated with one or more carboxylic functional groups, and from 0.01 to 5 parts of an organic peroxide, per 100 parts of copolymer to be modified.

The compound containing a double bond is preferably selected from the group consisting of maleic acid or anhydride, dimaleimides, such as p-phenylene- and hexamethylene dimaleimides fumaric acid and various acrylates, such as methyl-, ethyl-, 2-ethyl-hexyl acrylates.

The copolymer thus treated contains cross-linking bonds. Its partial cross-linking can be reduced to a minimum by using very small amounts of organic peroxide so that the resulting product is still soluble and highly swollen by the solvents for the copolymer.

The copolymer after modification with a compound having a double bond, contains reactive functional groups which can be successfully utilized for obtaining adhesion to the fibers.

The process according to the invention also provides for a treatment of the fiber with a solution of copolymer modified e.g., with maleic acid, and containing small amounts of a polyisocyanate. The polyisocyanate is an ambivalent reactant capable of reacting with the modified copolymer and with the fiber.

On the other hand, it should be noted that the thus modified copolymer is capable of binding itself perfectly with mixes containing the unmodified copolymer through the cross-linkages generated by the common vulcanizing agent (organic peroxides), due to the perfect physical compatibility between the modified and the unmodified copolymers.

It is also found that, instead of carrying out a previous grafting of the compound containing a double bond, such as maleic acid, onto the copolymer, it is possible to add directly to the mix containing the unmodified copolymer, an organic peroxide, maleic acid and the organic polyisocyanate in such a ratio that there is always a small excess of isocyanic groups with respect to the carboxylic groups.

The grafting in this case occurs in situ, namely, during the subsequent vulcanization and the polyisocyanate makes possible the formation of cross-linkages between the copolymer and the fiber.

This method also makes is possible to avoid the difficulties involved in the use of a treatment bath and allows the rubber coating of the fabric by simple calender-frictioning of same with the rubber mix to become adhesive by the method of this invention.

In the latter case it should be noted that, if the mix used for the calendering also contains reinforcing fillers (in addition to the copolymer, maleic acid and the polyisocyanate), there is the possibility (due to the particular physical nature of the filler particles) of an interaction between the filler and the polyisocyanate. In this case all the isocyanic groups may be consumed and the adhesive characteristics of the mix are lost.

There is the advantage, however, that the mix after vulcanization will possess parameters which exhibit a reinforcement value higher than that obtained in absence of polyisocyanates.

When black fillers are employed in the mix containing maleic acid and polyisocyanates according to this invention, outstanding adhesive improvements are observed with carbon blacks of the furnace type, and outstanding reinforcement improvements are observed with carbon blacks of the channel type.

In the case of a copolymer which has not been previously grafted, the preferred ratio between the carboxylic groups of maleic acid and isocyanic functional groups is about 1:3. With this ratio the adhesivity increases with the concentration of the reactants; whereas it decreases until it is completely nil upon increasing the carboxyls/isocyanic ratio.

Organic polyisocyanates having the formula

OCN—R—NCO wherein R is a divalent hydrocarbon radical, can be employed according to the present invention. The preferred compounds are those which have a high molecular weight and are therefore very slightly volatile and less toxic, such as for instance: 1,6-hexane diisocyanate; 2,4- or 2,6-tolylene-diisocyanate; diphenylmethane diisocyanate, triphenylmethane triisocyanate, 1-chloro-phenylene-2,4-diisocyanate and the like.

The following examples show the use of the preferred adhesives which are the type normally used for bodying dienic rubbers to cellulose fibers. According to the present invention the products obtained by condensation of compounds containing reactive groups, with aldehydes, such as, for example, phenols in general, urea, casein and melamine with an aldehyde, such as preferably formaldehyde. These compounds in general are obtained with such a degree of condensation that they are water-soluble compounds. The examples of the present invention particularly exemplify water-soluble resorcinol-formaldehyde condensation products.

Other objects and characteristics of the invention will appear from the following examples which are merely illustrative and do not limit the scope of the invention.

In the examples, both olefin copolymers are indicated by the term copolymer.

EXAMPLE 1

A cord of polyamide fibers (nylon), with a diameter of 0.90 mm. is immersed for 3 minutes into a 2% solution of Vulcabond TX (Vulcabond TX is a 50% solution of methylene diisocyanate in xylene).Then, after a complete drying in an oven at 50–60° C., it is immersed for 3 minutes in a 5% heptane solution of sulfochlorinated ethylene copolymer (i.e., ethylene-propylene copolymer), and is finally dried at 50–60° C.

The sulfochlorinated copolymer (ethylene-propylene or ethylene-butene copolymer) used is prepared from a copolymer containing about a 50/50 mol ratio of ethylene and propylene or butene, and having a molecular weight of about 120,000.

The sulfochlorination is carried out by dissolving the polymer in carbon tetrachloride and passing a stream of chlorine and sulfur dioxide through the solution in the presence of actinic light. From this solution, when the reaction is completed, a product containing about 3% of chlorine and about 1.1% of sulfur is isolated.

The evaluation of the adhesion is carried out by the "H Test" method (Rubber Chemistry and Technology, vol. XX, No. 1, January 1947, page 268).

The mix of ethylene copolymer to be coupled with the nylon cord has the following composition (parts by weight):

| | |
|---|---|
| Copolymer | 100 |
| Carbon black EPC | 30 |
| Diphenyl guanidine | 1 |
| MgO | 2 |
| Sulfur | 0.4 |
| Cumyl peroxide | 3.3 |

Table 1 shows the effectiveness of interposing a layer of sulfochlorinated copolymer between the adhesive placed on the cord and the mix containing a copolymer containing 50% moles ethylene.

*Table 1*

Adhesion, according to the "H Test" of a nylon cord to the copolymer mix of Example 1, using isocyanate and sulfochlorinated copolymer (the results reported are the average of at least 6 determinations):

| Test | Substituents | "H Test" | |
|---|---|---|---|
| | | Reading at the dynamometer (kg.) | Adhesion (kg./cm.²) |
| 1 | Nylon/copolymer | | (¹) |
| 2 | Nylon/5% copolymer solution in heptane/copolymer. | | (¹) |
| 3 | Nylon/5% sulfochlorinated copolymer solution in heptane/copolymer. | 0.8 | 3.0 |
| 4 | Nylon/2% Vulcabond TX solution in xylene/copolymer. | 4.7 | 17.5 |
| 5 | Nylon/2% Vulcabond TX solution in xylene/5% sulfochlorinated copolymer solution in heptane/copolymer. | 9.0 | 33.5 |

¹ It does not adhere.

EXAMPLE 2

A rayon viscose cord with a diameter of 0.65 mm. is immersed for 3 minutes in a solution of resorcinol-formaldehyde resin, having the following composition (parts by weight):

| | |
|---|---|
| H₂O | 100 |
| Resorcinol | 11 |
| 36% formaldehyde | 22 |
| NaOH | 1.7 |

The solution, before the treatment, is allowed to age for about 1 hour. After complete drying in an oven at about 80° C., the rayon cord is immersed for 3 minutes in the 5% heptane solution of sulfochlorinated copolymer of Example 1.

The cord is then dried at 50–60° C.

Using the same unmodified copolymer mix as that of Example 1, the adhesion results shown in Table 2 are obtained.

In addition, in this case the different reactivity exerted by the resorcinol-formaldehyde resin (RF) with respect to the sulfochlorinated copolymer and of the unmodified copolymer is evident.

In test 6 of Table 2, a further increase in the adhesivity of the copolymer to the rayon cord is observed upon adding to the sulfochlorinated copolymer small amounts of the polyisocyanate (Desmodur R which is a 20% solution of triphenylmethane triisocyanate in methylene chloride).

The adhesion for this example is determined with a method different from the "H Test." This method which is suitable for cord-type fabrics consists of vulcanizing two overlapping rubber-coated fabrics with parallel sheets so as to obtain a vulcanized product having a final thickness between 2 and 3 mm. From these vulcanized rubber-coated fabrics having a double layer of cords, rectangular specimens with a width of 2 cm. and a length of at least 10 cm. are prepared along the direction of the cords. In these specimens two parallel cuts are made (one cut per each surface) perpendicular to the direction of the cords by cutting only the first cord layer. The distance between the two cuts is 1 cm. Each specimen is subjected to tensile tests in a dynamometer (with a rate of separation of the grips of 300 mm./min.). By considering that the traction for the adhesion involves a surface of 2 cm.$^2$ (2 cm. of width by 1 cm. of length) the results are calculated in g./mm.$^2$.

The cord-type rayon fabric used by us has the following characteristics:

Cords/inch _____ 28
Wefts/inch _____ 1.3
Average diameter of the cords _____mm__ 0.65
Average tensile strength of a cord _____kg__ 8
Average percent elongation of a cord under a load of 10 pounds _____percent__ 14

By subjecting the cord-type fabric to a treatment similar to that of test No. 6 of Table 2, the following results are obtained (average of at least 15 tests):

|  | At room temp. | At about 80° C. |
|---|---|---|
| Average value of the adhesion (g./mm.$^2$) | 572 | 411 |
| Maximum value of the adhesion (g./mm.$^2$) | 613 | 440 |

*Table 2*

Adhesion (according to the "H Test") of a rayon cord to the copolymer through a resorcinolformaldehyde (RF) resin, an isocyanate and the sulfochlorinated copolymer (the results reported hereinbelow are the average of at least 6 values):

| Test | Substituents | "H Test" Reading at the dynamometer (kg.) | Adhesion (kg./cm.$^2$) |
|---|---|---|---|
| 1 | Rayon/Copolymer | 2.0 | 10 |
| 2 | Rayon/RF/copolymer | 4.0 | 20 |
| 3 | Rayon/RF/5% heptane solution of the copolymer/copolymer. | 4.4 | 22 |
| 4 | Rayon/RF/2% Desmodur R solution/copolymer. | 6 | 30 |
| 5 | Rayon/RF/5% sulfochlorinated copolymer solution/copolymer. | 8.0 | 40 |
| 6 | Rayon/RF/5% sulfochlorinated copolymer solution containing 2% of Desmodur R solution/copolymer. | [1] 10.5 | >52 |

[1] Rayon breaks.

EXAMPLE 3

The adhesion of the ethylene copolymers to a square cotton fabric having the following characteristics:

Count
Warp, 10 yarns/cm. _____ 16/6
Weft, 10 heatings/cm. _____ 16/6 is very limited. It can be highly improved by putting onto the fabrics, an adhesive layer containing a sulfochlorinated copolymer.

This adhesive contains the following.

Adhesive (CSI):                                  Parts by weight
  Sulfochlorinated copolymer (40% mol. ethylene) ___ 100
  Natural rubber _____ 20
  Silica (Durosil) _____ 50
  TiO$_2$ _____ 20
  MgO _____ 2
  Diphenylguanidine _____ 1
  Cumyl peroxide _____ 3
  Sulfur _____ 2.8

These ingredients are dispersed in heptane to form a 5–10% dispersion.

Peeling tests (specimens with a width of 2 cm. and a thickness of 8 mm.: rate of separation of the grips, 52 mm./minute) give the results shown in Table 3 using the copolymer mix of Example 1.

*Table 3*

Adhesion (determined by peeling) of a square cotton fabric to the unmodified copolymer. The results reported are the average of at least 6 determinations:

Substituents:                          Adhesion, kg./cm.
  Cotton/copolymer _____ 2.5
  Cotton/adhesive CSI/copolymer _____ 8

EXAMPLE 4

When isocyanates are employed, only one impregnation bath for the rayon cords may optionally be used in order to effect the adhesion of the cords to the copolymer. In this case, it is however necessary to modify the copolymer. This is accomplished by mixing in a 2-liter Banbury mixer at 40 r.p.m. and at 200° C. for 10 minutes, the following mix (parts by weight):

Copolymer (45% mol. ethylene) _____ 100
Maleic acid _____ 3
Tetrachlorinated tert. butyl peroxide _____ 3

A partially cross-linked, but still readily heptane-soluble copolymer is thus obtained.

A 5% solution is prepared to which a Desmodur R (20% solution of triphenylmethane triisocyanate in methylene chloride) solution in benzene (ratio 1:4) is added in such amount as to obtain a Desmodur R concentration in the final solution of 0.5%. This final solution called "Isomal" has the following composition:

Heptane _____ 85.0
Modified copolymer _____ 5.0
Desmodur R (100%) _____ 0.5
Benzene and CH$_2$Cl$_2$ _____ 9.5
                                                    ———
                                                   100.0

It is sufficient to immerse the rayon cords, previously dried in oven, in the Isomal solution and to dry them again. They are thus capable of adhering (after vulcanization) to the copolymer mixes.

Using the copolymer mix of Example 1, Table 4 shows a significant improvement in the adhesion obtained with the Isomal.

*Table 4*

Adhesion (determined by the "H Test") of a rayon cord to the copolymer using "Isomal" (the results reported are the average of at least 6 values):

| Substituents | "H Test" Reading in the dynamometer (kg.) | Adhesion (kg./cm.²) |
|---|---|---|
| Rayon/copolymer | 2.3 | 10 |
| Rayon/5% copolymer solution in heptane/copolymer | 2.4 | 10.5 |
| Rayon/5% modified copolymer solution in heptane/copolymer | 4.7 | 23.5 |
| Rayon/0.5% Desmodur R solution in benzene/copolymer | 5.2 | 26.0 |
| Rayon/Isomal/Copolymer | 9.5 | 47.5 |

EXAMPLE 5

Isomal is effective also for effecting the adhesion of nylon cords to the copolymer.

Thus by operating as in Example 4, but using nylon instead of rayon, the results shown in Table 5 are obtained.

*Table 5*

Adhesion (according to the "H Test") of a nylon cord to the copolymer using Isomal (the results reported are the average of at least 6 values):

| Substituents | "H Test" Reading in the dynamometer (kg.) | Adhesion (kg./cm.²) |
|---|---|---|
| Nylon/copolymer | --- | (¹) |
| Nylon/5% copolymer solution in heptane/copolymer | --- | (¹) |
| Nylon/5% modified copolymer solution in heptane/copolymer | --- | (¹) |
| Nylon/0.5% Desmodur R solution in benzene/copolymer | 5.2 | 19.2 |
| Nylon/Isomal/copolymer | 10.0 | 37.3 |

¹ Does not adhere.

EXAMPLE 6

Isomal is also useful for the adhesion of the copolymer to cotton.

Peeling tests with the square fabric of Example 3, give the results shown in Table 6. The considerable increase caused by Isomal in the cotton-to-copolymer adhesion is evident. The technique as usual comprises a previous drying of cotton in an oven, immersion into Isomal and further drying.

*Table 6*

Adhesion (by peeling tests) of a square cotton fabric to the copolymer using Isomal (the results reported are the average of at least 6 determinations):

Substituents: Adhesion, kg./cm.²
Cotton/copolymer _____ 2.5
Cotton/5% copolymer solution heptane/copolymer _____ 2.7
Cotton/5% modified copolymer solution in heptane/copolymer _____ 3.5
Cotton/0.5% Desmodur R solution in benzene/copolymer _____ 3.0
Cotton/Isomal/copolymer _____ 7.0

EXAMPLE 7

In the preparation of Isomal, the copolymer can also be modified with amounts of tetrachlorinated tert. butyl peroxide and maleic acid different from the amounts used in Example 4.

Upon using a mix (to be treated in a Banbury) having the following composition:

Parts by weight
Copolymer _____ 100
Maleic acid _____ 2
Tetrachlorinated tert. butyl peroxide _____ 1.5 the adhesion results reported at the bottom of Table 7 are obtained.

*Table 7*

| | | | | | | | |
|---|---|---|---|---|---|---|---|
| Copolymer | 100 | 100 | 100 | 100 | 100 | 100 | 100 |
| Sulfur | 0.3 | 0.3 | 0.3 | 0.3 | 0.3 | 0.3 | 0.3 |
| Cumyl peroxide | 2.6 | 2.6 | 2.6 | 2.6 | 2.6 | 2.6 | 2.6 |
| Carbon black: | | | | | | | |
| SAF | 80 | ---- | ---- | ---- | ---- | ---- | ---- |
| ISAF | ---- | 80 | ---- | ---- | ---- | ---- | ---- |
| HAF | ---- | ---- | 80 | ---- | ---- | ---- | ---- |
| FEF | ---- | ---- | ---- | 80 | ---- | ---- | ---- |
| HHF | ---- | ---- | ---- | ---- | 80 | ---- | ---- |
| EPC | ---- | ---- | ---- | ---- | ---- | 40 | ---- |
| MPC | ---- | ---- | ---- | ---- | ---- | ---- | 40 |
| MgO | ---- | ---- | ---- | ---- | ---- | 2 | 2 |
| Diphenylguanidine | ---- | ---- | ---- | ---- | ---- | 1 | 1 |
| Adhesion to rayon,¹ kg./cm.² | 50 | 35 | 50 | 40 | 40 | 43 | 40 |
| H Test to nylon,¹ kg./cm.² | 64 | 56 | 60 | 57.5 | 48 | 50 | 41 |

¹ The compositions are molded in a press at 165° C. for 30 minutes.

EXAMPLE 8

In a roll mixer a mix is prepared by adding in order:

Parts by weight
Ethylene-propylene copolymer _____ 100
Carbon black SRF _____ 30
Sulfur _____ 0.4
Dicumyl peroxide _____ 3.3

Maleic acid and a polyisocyanate such as triphenylmethane triisocyanate and diphenylmethane diisocyanate may also be added if desired.

The mix is then calendered onto a square cotton fabric (having the properties shown in Example 3) in a vertical calender.

The peeling results are obtained as described in Example 3. Table 8 clearly shows the influence of the concentration of the reactants and of their moleclular ratio in the bodying onto cotton.

*Table 8*

Basic mix:
Copolymer _____ 100 parts by weight.
Carbon black SRF _____ 30 parts by weight.
Sulfur _____ 0.4 parts by weight.
Dicumyl peroxide _____ 3.3 parts by weight.
Maleic acid _____ Variable amounts.
Desmodur R _____ Variable amounts.
Hylene M _____ Variable amounts.
Vulcanization _____ 30 min. at 165° C.

| Isocyanate/Maleic acid, molar ratio | Desmodur R 100% | Hylene M¹ | Maleic Acid | Modulus at 300% | Peeling (kg./cm.) |
|---|---|---|---|---|---|
| | ---- | ---- | ---- | 49 | 1.5 |
| | 1.9 | ---- | ---- | 50 | 2.6 |
| | ---- | 1.3 | ---- | 49 | 2.3 |
| | ---- | ---- | 0.3 | 42 | 1.8 |
| 2:1 | 0.63 | ---- | 0.1 | 55 | 2.2 |
| | 1.26 | ---- | 0.2 | ---- | 3.3 |
| | 1.9 | ---- | 0.3 | 42 | 4.5 |
| | 3.16 | ---- | 0.5 | 42 | 6.0 |
| | 6.32 | ---- | 1.0 | ---- | >7 |
| 1:1 | 0.32 | ---- | 0.1 | 47 | 1.8 |
| | 0.63 | ---- | 0.2 | 50 | 2.3 |
| | 0.95 | ---- | 0.3 | 51 | 2.7 |
| | 1.58 | ---- | 0.5 | 44 | 4.2 |
| | 3.16 | ---- | 1.0 | 40 | 6.0 |
| 1:2 | 0.16 | ---- | 0.1 | 46.5 | 1.6 |
| | 0.32 | ---- | 0.2 | 53.5 | 2.0 |
| | 0.47 | ---- | 0.3 | 49 | 2.2 |
| | 0.79 | ---- | 0.5 | 43.5 | 2.7 |
| | 1.58 | ---- | 1.0 | 43.5 | 3.7 |
| 2:1 | ---- | 0.43 | 0.1 | 47 | 1.8 |
| | ---- | 0.85 | 0.2 | 48 | 2.3 |
| | ---- | 1.3 | 0.3 | 49 | 2.8 |
| | ---- | 2.15 | 0.5 | 51 | 4.0 |
| | ---- | 4.3 | 1.0 | 49 | 7 |
| 1:1 | ---- | 0.22 | 0.1 | 44 | 1.7 |
| | ---- | 0.43 | 0.2 | 47 | 2.1 |
| | ---- | 0.65 | 0.3 | 44 | 2.4 |
| | ---- | 1.1 | 0.5 | 54 | 2.8 |
| | ---- | 2.15 | 1.0 | 45 | 3.9 |

¹ Diphenylmethane diisocyanate.

EXAMPLE 9

By proceeding as in Example 8, 30 parts of carbon black EPC are substituted for carbon black SRF.

In Table 9, the absence of adhesivity characteristics in the mix is shown. A reinforcing action is however obtained as shown by the increased modules at 300% which appears to depend on the concentration of the reactants and on their molecular ratio.

*Table 9*

Basic mix:
- Copolymer _____ 100 parts by weight.
- Carbon black EPC _____ 30 parts by weight.
- MgO _____ 2 parts by weight.
- Diphenylguanidine _____ 1 part by weight.
- Sulfur _____ 0.4 part by weight.
- Cumyl peroxide _____ 3.3 parts by weight.
- Vulcanization _____ In a press for 30 minutes at 165° C.

| Isocyanate/Maleic acid, molar ratio | Desmodur R 100% | Hylene M | Maleic Acid | Modulus at 300% | Peeling (kg./cm.) |
|---|---|---|---|---|---|
|  |  |  |  | 45 | 1.5 |
|  | 1.9 |  |  | 90 | 2.1 |
|  |  | 1.3 |  | 47.5 | 2.0 |
|  |  |  | 0.3 | 39 | 1.8 |
| 2:1 | 0.63 |  | 0.1 | 50 | 1.6 |
|  | 1.26 |  | 0.2 | 71.5 | 1.8 |
|  | 1.9 |  | 0.3 | 87 | 1.9 |
|  | 3.16 |  | 0.5 | 97.5 | 2.1 |
|  | 6.32 |  | 1.0 | 99 | 2.6 |
| 1:1 | 0.32 |  | 0.1 | 48 | 1.8 |
|  | 0.63 |  | 0.2 | 52.5 | 1.6 |
|  | 0.96 |  | 0.3 | 62.5 | 1.9 |
|  | 1.58 |  | 0.5 | 87 | 1.7 |
|  | 3.16 |  | 1.0 | 87 | 1.9 |
| 1:2 | 0.16 |  | 0.1 | 41.5 | 1.7 |
|  | 0.32 |  | 0.2 | 41.5 | 1.6 |
|  | 0.47 |  | 0.3 | 51 | 1.7 |
|  | 0.79 |  | 0.5 | 58 | 1.9 |
|  | 1.58 |  | 1.0 | 60 | 1.7 |
| 2:1 |  | 0.43 | 0.1 | 42 | 1.9 |
|  |  | 0.85 | 0.2 | 45 | 2.0 |
|  |  | 1.3 | 0.3 | 46 | 1.8 |
|  |  | 2.15 | 0.5 | 52 | 1.9 |
|  |  | 4.3 | 1.0 | 64 | 1.7 |
| 1:1 |  | 0.22 | 0.1 | 43 | 1.4 |
|  |  | 0.43 | 0.2 | 43 | 1.7 |
|  |  | 0.65 | 0.3 | 42 | 1.6 |
|  |  | 1.1 | 0.5 | 45 | 1.9 |
|  |  | 2.15 | 1.0 | 56 | 1.8 |

EXAMPLE 10

A motor-scooter tire (size 4.00 x 8) is manufactured completely using the ethylene copolymer.

The rayon cord-type fabric used for preparing the rubber-coated fabrics is that described in Example 2.

The fabric is treated in an adhesive-applying apparatus having heating sections for drying the fabric before and after the treatment bath. The fabric remains in contact with the adhesive solution for about one minute. The adhesive solution used is the Isomal of Example 4, but the modified copolymer of it is that of Example 7.

The fabric is coated with rubber in a common commercial calender thereby obtaining a final rubber-coated fabric having a thickness of about 1.5 mm. The mix used for coating the rayon fabric with rubber contains the following:

Parts by weight
- Copolymer _____ 100
- Carbon black EPC _____ 30
- MgO _____ 2
- Diphenylguanidine _____ 1
- Sulfur _____ 0.4
- Cumyl peroxide _____ 3.3

The mix used for the tire tread is the following:
- Copolymer _____ 100
- Carbon black HAF _____ 50
- Cumyl peroxide _____ 2.6
- Sulfur _____ 0.3

The rubber coated fabrics are cut at an angle of 60° and placed with the rings on the drum. The tread is then placed onto the rubber-coated fabric which is still supported by the drum.

The shaping is carried out with the technique used in bag-o-matic apparatus, under a pressure of 1–2 atm. with steam. The vulcanization is then carried out for about 1 hour under a steam pressure of 7 atm. inside the bag and 8 atm. in the outer part of the mold.

The tire thus prepared is tested for 2000 km. on a "road wheel" provided with a knurled surface and a diameter of 35 cm., with a load of 160 kg. on the axis, at the speed of 80 km./h.

During the test the tire reaches a temperautre of about 60° C. on its outer surface. Tests are also carried out with increasing loads on the axis.

With a load of 250 kg. the fabrics are broken in the area of the flexure zone. A tire prepared using the same methods but composed entirely of natural rubber exhibits an analogous behavior in the "road-wheel" tests.

EXAMPLE 11

Two automobile tires (size 5.20 x 14) are manufactured entirely of the instant copolymers. Up to the shaping step, the procedure of the preceding example is followed, while the vulcanization is carried out for 1½ hours with 8 atm. of steam, under a molding pressure of about 20 atm., produced by means of compressed water.

The tires, tested on a "road wheel" having a diameter of 88 cm. and a knurled surface, for 2000 kg. at the speed of 60 km./h. with a load of 500 kg. on the axis, did not show any alteration.

EXAMPLE 12

A conveyor belt having a width of 50 cm. and a thickness of 0.9 cm. is manufactured by using the square cotton fabric of Example 7.

Using the same adhesive-applying apparatus of Example 8, this fabric is treated with the Isomal of Example 8 and is then rubber-coated with the rubber-coating mix of Example 8.

Three of these rubber-coated fabrics are dried and then interposed between two sheets of copolymer mix with a thickness of 2 and 3 cm. respectively. The copolymer mix had the following composition:

Parts by weight
- Copolymer _____ 100
- Carbon black ISAF _____ 60
- Sulfur _____ 0.3
- Cumyl peroxide _____ 2.6

After vulcanization in a press, some specimens for the peeling tests were cut from the belt. The value of the adhesions is found to be always higher than 5 kg./cm.

EXAMPLE 13

V-belts are manufactured as follow: A cylinder with a diameter of 273 cm. is placed between the centers of a lathe. A layer of copolymer mix having a thickness of about 6 mm. is wound upon the cylinder.

This copolymer mix has the following composition:

Parts by weight
- Copolymer _____ 100
- Carbon black SRF _____ 100
- Carbon black FEF _____ 30
- Sulfur _____ 0.4
- Dicumyl peroxide _____ 4.0

A rayon cord (previously treated with Isomal as shown in the preceding examples) is then wound upon this layer of copolymer mix so as to have an average of 12 cords every 10 mm. Onto this cord layer, another layer of the said copolymer mix, with a thickness of about 1 mm. is then applied.

Then, another layer of cords treated with Isomal and a layer of copolymer mix with a thickness of 1 mm. are applied, and so on, until the formation of 5 cord layers is achieved. The last layer of copolymer mix has a thickness of about 2 mm.

On the cylinder, several rings each having a thickness of 20 mm. are cut and wrapped in a square cotton fabric treated with Isomal and rubber-coated with the copolymer mix of Example 1. The whole mass is vulcanized. These V-belts upon being subject to tests are shown to possess properties which in all cases are at least as good as those of the commercial V-belts made of conventional materials.

EXAMPLE 14

Adhesion to synthetic fibers and to metals can also be achieved without having recourse to a previous grafting of maleic acid onto the copolymer. It is sufficient for this purpose to add maleic acid and the organic polyisocyanate directly to the mix of copolymer and fillers, in such a molar ratio that the isocyanic groups are always in excess with respect to the carboxylic functional groups.

The grafting of maleic acid occurs during the vulcanization and the isocyanate makes possible the formation of cross-linkages between the copolymer and the fabric or the metal. This method makes it possible to prepare an adhesive mix which, in the particular case of the fibers, can be used in an economically advantageous way in place of the preliminary treatment of the fibers with solutions, by simply frictioning the fabric with the same adhesive mix.

In Table 10 are reported the compositions of the mixes and the adhesion values determined by peeling tests according to ASTM D413–39 specification.

Table 10

| Copolymer | 100 | 100 | 100 | 100 | 100 | 100 | 100 | 100 | 100 |
|---|---|---|---|---|---|---|---|---|---|
| SRF | 30 | 30 | 30 | 30 | 30 | 30 | 30 | 30 | 30 |
| Sulfur | 0.4 | 0.4 | 0.4 | 0.4 | 0.4 | 0.4 | 0.4 | 0.4 | 0.4 |
| Cumyl peroxide | 3.3 | 3.3 | 3.3 | 3.3 | 3.3 | 3.3 | 3.3 | 3.3 | 3.3 |
| Maleic acid | | 0.3 | | | 0.08 | 0.16 | 0.32 | 0.64 | 0.3 |
| Desmodur R [1] | | | 10 | | 2.5 | 5 | 10 | 20 | |
| HyleneM [2] | | | | 2 | | | | | 2 |
| Peeling: | | | | | | | | | |
| Cotton | 1.5 | 2 | 2.5 | 2.8 | 2.5 | 2.4 | 4.2 | 4.5 | 4.3 |
| Rayon | 1.0 | 1.5 | 2.0 | 2.0 | 2.3 | 4.3 | 5.5 | 6.0 | 5.5 |
| Aluminum | None | None | None | None | None | Slight | 3.6 | 7 | 4.5 |
| Stainless steel | None | None | None | None | Slight | Slight | 4.5 | 7 | 4.2 |

[1] 20% solution of triphenylmethane triisocyanate in methylene chloride.
[2] Crystalline solid: diphenylmethane diisocyanate.

The term "unmodified copolymer" is intended to refer to a copolymer in its normal state, which copolymer has not been subjected to the partial cross-linking and sulfochlorination treatments disclosed herein.

Many variations and modifications can, of course, be practised without departing from the spirit and scope of the present invention.

Having thus described the present invention what it is desired to secure and claim by Letters Patent is:

1. A process for the adhesive bodying onto a fiber material of a saturated amorphous copolymer of ethylene with a higher alpha-olefin having the formula $$CH=CH-CH_2R$$

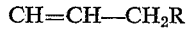

in which R is a hydrogen atom or a methyl group, which comprises applying onto the fiber material a first coating consisting of an adhesive for diene rubbers that is selected from the group consisting of a phenol-formaldehyde resin and a polyisocyanate, drying said first coating, applying onto said treated fiber material a second coating consisting of (a) an adhesive for saturated elastomers that is selected from the group consisting of a sulphochlorinated ethylene-propylene copolymer, a sulphochlorinated ethylene-butene-1 copolymer, an ethylene-propylene copolymer partially cross-linked with maleic acid or anhydride, an ethylene-butene-1 copolymer partially cross-linked with maleic acid or anhydride, the reaction product of an organic polyisocyanate with an ethylene-propylene copolymer partially cross-linked with maleic acid, and the reaction product of an organic polyisocyanate with an ethylene-butene-1 copolymer partially cross-linked with maleic acid, (b) reinforcing fillers and, as vulcanization agents, an organic peroxide and a free-radical acceptor, drying the second coating, applying onto the second coating a layer containing a saturated amorphous copolymer of ethylene with a higher alpha-olefin as above defined, an organic peroxide and a free-radical acceptor, and finally vulcanizing the whole mass by heating to a temperature from 110° to 220° C.

2. A process according to claim 1, wherein the heating is carried out at a temperature of 140° to 180° C.

3. A process according to claim 1, wherein the ethylene-propylene and ethylene-butene-1 copolymers used both as such in the layer and modfied by sulphochlorination or by partial cross-linking with maleic acid or anhydride in the second coating have a molecular weight between 60,000 and 800,000 and an ethylene content of 10 to 80% by moles.

4. A process according to claim 3, wherein said copolymers each have a molecular weight between 80,000 and 500,000.

5. A process according to claim 1, wherein the adhesive for diene rubbers is a water-soluble condensation product of a phenol and formaldehyde.

6. A process according to claim 5, wherein the adhesive for diene rubbers comprises a solution of resorcinol-formaldehyde resin.

7. A process according to claim 1, wherein the adhesive for diene rubbers is a polyisocyanate having a high molecular weight, a low volatility and a low toxicity.

8. A process according to claim 7, wherein the polyisocyanate is selected from the group consisting of 1,6-hexane diisocyanate, 2,4-tolylene diisocyanate, 2,6-tolylene diisocyanate, diphenylmethane diisocyanate, triphenylmethane triisocyanate, and 1-chlorophenylene-2,4-diisocyanate.

9. A process according to claim 1, wherein the sulphochlorinated ethylene-propylene and the sulphochlorinated ethylene-butene-1 copolymers used in the second coating are an ethylene-propylene and respectively an ethylene-butene-1 copolymers that were previously modified by sulphochlorination and that contain from 0.05 to 5% sulphur and from 1 to 40% chlorine.

10. A process according to claim 1, wherein the partially cross-linked ethylene-propylene and ethylene-butene-1 copolymers used in said second coating are an ethylene-propylene and ethylene-butene-1 copolymers that were previously partially cross-linked by treatment at 150° C.–200° C. with from 0.05 to 10 parts by weight of maleic acid or anhydride per 100 parts of copolymer, in the presence of 0.01 to 5 parts of an organic peroxide per 100 parts of copolymer.

11. A process according to claim 1, wherein the partial cross-linking of the copolymer as such is carried out in situ.

12. A process according to claim 1, wherein maleic acid in an amount from 0.05 to 10 parts and an organic peroxide in an amount between 0.01 to 5 parts per 100 parts of copolymer is used as the agent for the in situ chemical modification of the unmodified copolymer in the second coating and wherein said modification takes place during the vulcanization stage.

13. A process according to claim 12, characterized in that the said modification of the unmodified olefin copolymer in situ during the vulcanization stage and the contemporaneous bodying of the copolymer with the fiber is carried out by adding to said second coating mixture containing the unmodified copolymer, an organic peroxide and maleic acid, and as the adhesive, a polyisocyanate, said polyisocyanate being added in such amount so as to obtain an excess of isocyanic functional groups over the carboxylic functional groups of the maleic acid.

14. A process according to claim 13, wherein the ratio between the carboxylic and isocyanic groups is 1:3.

15. A process according to claim 14, wherein said second coating containing unmodified olefin copolymer, maleic acid, an organic peroxide and a polyisocyanate, also contains a filler comprising carbon black of the furnace type which maintains the good adhesivity characteristics of said coating.

16. A process according to claim 15, wherein the filler comprises carbon black of channel type which exerts a reinforcing action.

17. A process according to claim 1, wherein the organic peroxide is selected from the group consisting of di-tertiary alkyl peroxides, chlorinated di-tertiary alkyl peroxides and di-aralkyl peroxides.

18. A process according to claim 1, wherein the free radical acceptor is sulphur.

19. A process according to claim 18, wherein the sulphur is present in an amount of about 1 gram atom of sulphur per mol of organic peroxide.

20. A process according to claim 1, wherein the fiber material comprises rayon.

21. A process according to claim 1, wherein the fiber material comprises a polyamide.

22. A process according to claim 1, wherein the fiber material comprises cotton.

23. A vulcanized article comprising (1) a textile fiber material; (2) a first coating containing an adhesive selected from the group consisting of a phenol formaldehyde resin and a polyisocyanate; (3) a second coating containing an adhesive selected from the group consisting of a sulphochlorinated ethylene-propylene copolymer, a sulphochlorinated ethylene-butene-1 copolymer, an ethylene copolymer partially cross-linked with maleic acid or anhydride, an ethylene-butene-1 copolymer partially cross-linked with maleic acid or anhydride, the reaction product of an organic polyisocyanate with an ethylene-propylene copolymer partially cross-linked with maleic acid and the reaction product of an organic polyisocyanate with an ethylene-butene-1 copolymer partially cross-linked with maleic acid, and (4) a layer containing a copolymer of ethylene with a higher alpha-olefin having the formula $CH_2=CH-CH_2R$ in which R is a hydrogen atom or a methyl group.

References Cited by the Examiner
UNITED STATES PATENTS

| | | | |
|---|---|---|---|
| 2,128,229 | 8/1938 | Hale et al. | 117—76 |
| 2,625,523 | 1/1953 | Garber et al. | 117—161 |
| 2,690,229 | 10/1954 | Cousins | 117—162 |
| 2,854,357 | 9/1958 | Johnson et al. | 117—138.8 |
| 2,854,425 | 9/1958 | Boger et al. | 117—76 |
| 2,881,098 | 4/1959 | Dinorscia | 117—162 |
| 2,988,457 | 6/1961 | Gatcomb | 117—138.8 |

ALFRED L. LEAVITT, *Primary Examiner.*

A. H. ROSENSTEIN, *Assistant Examiner.*